(12) United States Patent
Li

(10) Patent No.: US 12,710,128 B2
(45) Date of Patent: Aug. 18, 2026

(54) GIMBAL

(71) Applicant: Shenzhen JX ROBOT Technology Co., Ltd, Shenzhen (CN)

(72) Inventor: Hailong Li, Shenzhen (CN)

(73) Assignee: Shenzhen JX ROBOT Technology Co., Ltd, Shenzhen (CN)

( * ) Notice: Subject to any disclaimer, the term of this patent is extended or adjusted under 35 U.S.C. 154(b) by 158 days.

(21) Appl. No.: 18/760,126

(22) Filed: Jul. 1, 2024

(65) Prior Publication Data

US 2025/0035258 A1 Jan. 30, 2025

(30) Foreign Application Priority Data

Jul. 27, 2023 (CN) ......................... 202322003985.0

(51) Int. Cl.

*F16M 11/18* (2006.01)
*F16M 11/10* (2006.01)
*F16M 11/20* (2006.01)
*G03B 17/56* (2021.01)

(52) U.S. Cl.

CPC ............ *F16M 11/18* (2013.01); *F16M 11/10* (2013.01); *F16M 11/2042* (2013.01); *G03B 17/561* (2013.01); *F16M 2200/044* (2013.01)

(58) Field of Classification Search

CPC .... F16M 11/18; F16M 11/10; F16M 11/2042; G03B 17/561

See application file for complete search history.

(56) References Cited

U.S. PATENT DOCUMENTS 12,535,722 B2 * 1/2026 Luo ..................... G03B 17/561

* cited by examiner

*Primary Examiner* — Minh Q Phan

(57) ABSTRACT

The present application relates to the field of photographing auxiliary apparatus, more particularly, to a gimbal. The gimbal comprising a handle assembly, a first motor assembly, a second motor assembly, a third motor assembly, a clamping assembly, a control assembly and a target tracking assembly. The target tracking assembly is mounted on the third motor assembly and connected with the control assembly. The control assembly may be used to control the first motor assembly, the second motor assembly and the third motor assembly to rotate based on the tracking information obtained by the target tracking assembly, so that the photographing device clamped by the clamping assembly can keep tracking the target object to perform photographing.

18 Claims, 8 Drawing Sheets

GIMBAL

CROSS REFERENCE TO RELATED APPLICATIONS

The present application claims the benefit of Chinese Patent Application No. 202322003985.0 filed on Jul. 27, 2023, the contents of which are incorporated herein by reference in their entirety.

TECHNICAL FIELD

The present application relates to the field of photographing auxiliary apparatus, and more particularly, to a gimbal.

BACKGROUND

With the development of science and technology, convenient photographing devices such as mobile phones, digital cameras and so on, are more and more popular. These photographing devices can meet the photographing requirements of users anytime and anywhere. To ensure photographing quality, the photographing devices are generally mounted on a gimbal. The gimbal can keep the photographing apparatus mounted on it to be stable during photographing and achieve intelligent photographing functions such as target tracking.

However, most of the target tracking functions of gimbals in the market use specific apps installed on the mobile phones and then combined with the built-in camera of the mobile phones to implement the target tracking function. This brings forward high requirements on the gimbal users, increases the computing load of the mobile phone and thus increases the heat of the mobile phone. In addition, the target tracking of the gimbal is single-purpose and can only use the mobile phone to track target. Other photographing devices such as a moving camera cannot be used to track target.

SUMMARY

The embodiments of the present disclosure aim to resolve the technical problem of that it is difficult for the existing gimbal to achieve target tracking.

To solve above mentioned technical problem, one embodiment of the present disclosure provides a gimbal. The gimbal comprises:

a handle assembly;

a first motor assembly, wherein the first motor assembly is mounted at one end of the handle assembly and is configured to drive a photographing device to rotate in an axial direction of the first motor assembly;

a second motor assembly, wherein the second motor assembly is installed at one end of the first motor assembly and away from the handle assembly, the second motor assembly is configured to drive the photographing device to rotate in an axial direction of the second motor assembly;

a third motor assembly, wherein the third motor assembly is mounted at one end of the second motor assembly and away from the first motor assembly, the third motor assembly is configured to drive the photographing device to rotate in an axial direction of the third motor assembly;

a clamping assembly, wherein the clamping assembly is mounted on the third motor assembly and is configured to clamp the photographing device;

a control assembly, wherein the control assembly is mounted in the handle assembly and is connected to the first motor assembly, the second motor assembly and the third motor assembly; and a target tracking assembly, wherein the target tracking assembly is mounted on the third motor assembly and connected with the control assembly, the target tracking assembly is configured to obtain tracking information of a target object;

wherein the control assembly may be used to control the first motor assembly, the second motor assembly and the third motor assembly to rotate based on the tracking information obtained by the target tracking assembly, so that the photographing device clamped by the clamping assembly can keep tracking the target object to perform photographing.

In another embodiment of the present disclosure, the target tracking assembly comprises a vision module and a housing provided with a through-hole, the housing is detachably mounted on the third motor assembly, the vision module is installed in the housing and is connected to the control assembly, the vision module can obtain the tracking information of the target object through the through-hole.

In another embodiment of the present disclosure, the camera orientation of the vision module is same with the camera orientation of the photographing device.

In another embodiment of the present disclosure, the target tracking assembly further comprises a wireless positioning module, the wireless positioning module is installed in the housing and is connected to the control assembly;

when a communication device in the target object sends a communication signal, the wireless positioning module can receive the communication signal and perform wireless communication with the target object to obtain tracking information.

In another embodiment of the present disclosure, the antenna orientation of the wireless positioning module is same with the camera orientation of the photographing device.

In another embodiment of the present disclosure, the target tracking assembly further comprises a fill-in light module, the fill-in light module is installed in the housing and is configured to illuminate the target object.

In another embodiment of the present disclosure, the light-emitting surface of the ill-in light module is oriented in a same direction as the camera orientation of the photographing device.

In another embodiment of the present disclosure, the wireless positioning module is an ultra-wideband positioning module.

In another embodiment of the present disclosure, the axial direction of the first motor assembly, the axial direction of the second motor assembly and the axial direction of the third motor assembly are different.

In another embodiment of the present disclosure, a first connection portion is disposed on the target tracking assembly, a second connection portion cooperating with the first connection portion is disposed on the third motor assembly;

wherein the target tracking assembly is fixedly installed on the third motor assembly by cooperating of the first connection portion and the second connection portion, the target tracking assembly is electrically connected to the control assembly.

In another embodiment of the present disclosure, the distance between the target tracking assembly and the camera of the photographing device is less than or equal to a preset threshold, the target tracking assembly is oriented in a same direction as the camera orientation of the photographing device, the target tracking assembly comprises a detection module, a positioning module and a position adjusting module, the detection module is configured to receive orientation information of the target tracking assembly and to obtain first detection information;

the positioning module is configured to: when it is determined that the first feature recognition information of the target object exists according to the first detection information, obtain the biometric feature recognition information of the target object; when the biometric feature recognition information matches the preset biometric feature recognition information, determine a position of a target part based on the position of the biometric feature recognition information in the field of view, determine position information of the target object based on the position of the target part; the first feature recognition information is feature information of the target object in a specific posture; the biometric feature information is at least one of facial feature information, fingerprint feature information and iris feature information;

the position adjustment module is configured to send a tracking movement instruction to the control assembly based on the position information, so that the control assembly performs position adjustment control based on the position information and the camera of the photographing device oriented towards the target object.

The present disclosure further provides a gimbal tracking method, applied to the gimbal, wherein the distance between the target tracking assembly of the gimbal and the camera of the photographing device is less than or equal to a preset distance threshold, the target tracking assembly is oriented in a same direction as the camera orientation of the photographing device, further comprising:

receiving orientation information of the target tracking assembly, obtaining first detection information;

when it is determined that the first feature recognition information of the target object exists according to the first detection information, obtaining the biometric feature recognition information of the target object; when the biometric feature recognition information matches the preset biometric feature recognition information, determining a position of a target part based on the position of the biometric feature recognition information in the field of view and determining position information of the target object based on the position of the target part; the first feature recognition information is feature information of the target object in a specific posture; the biometric feature information is at least one of facial feature information, fingerprint feature information and iris feature information;

sending a tracking movement instruction to the control assembly based on the position information, triggering the control assembly performs position adjustment control based on the position information, so that the camera of the photographing device oriented towards the target object.

In another embodiment of the present disclosure, before receiving orientation information of the target tracking assembly and obtaining the first detection information, further comprising:

receiving orientation information of the target tracking assembly and obtaining second detection information;

when it is determined that the contour recognition information of the target object exists according to the second detection information, determining that the target object exists.

In another embodiment of the present disclosure, when it is determined that the contour recognition information of the target object exists according to the second detection information, determining that the target object exists comprising:

determining the contour information of each object according to the second detection information;

determining whether the contour information matching the target contour recognition information of the target object exists in the contour information of each object;

when it is determined that the contour information matching the target contour recognition information of the target object exists, determining that the target object exists.

In another embodiment of the present disclosure, before obtaining the biometric feature recognition information of the target object when it is determined that the first feature recognition information of the target object exists according to the first detection information, further comprising:

performing feature analysis on the first detection information to obtain a detection feature;

determining whether the first feature recognition information of the target object exists based on the detection feature.

In another embodiment of the present disclosure, before receiving orientation information of the target tracking assembly and obtaining the first detection information, further comprising:

receiving orientation information of the target tracking assembly and obtaining the third detection information;

determining a waggle frequency of the gimbal based on the third detection information; sending a position correction instruction to the control assembly when the waggle frequency is greater than a preset frequency threshold, so that the control assembly performs position correction control; and/or, determining a waggle angle of the gimbal based on the third detection information and sending a position correction instruction to the control assembly when the waggle angle is greater than a preset angle threshold, so that the control assembly performs position correction control.

In another embodiment of the present disclosure, before receiving orientation information of the target tracking assembly and obtaining the second detection information, further comprising:

receiving orientation information of the target tracking assembly and obtaining the third detection information;

determining a waggle frequency of the gimbal based on the third detection information; sending a position correction instruction to the control assembly when the waggle frequency is greater than a preset frequency threshold, so that the control assembly performs position correction control; and/or, determining a waggle angle of the gimbal based on the third detection information and sending a position correction instruction to the control assembly when the waggle angle is greater than a preset angle threshold, so that the control assembly performs position correction control.

In another embodiment of the present disclosure, after sending a tracking movement instruction to the control assembly based on the position information, triggering the control assembly performs position adjustment control based on the position information, so that the camera of the photographing device oriented towards the target object, further comprising:

receiving orientation information of the target tracking assembly and obtaining the fourth detection information;

obtaining preconfigured second posture feature information;

when it is determined that the second feature recognition information matching the second posture feature information exists based on the fourth detection information, stopping obtaining the orientation information of the target tracking assembly.

Comparing with the prior art, the gimbal provided in the embodiment of the present disclosure can obtain tracking information of a target object in real time by the target tracking assembly. The control assembly controls the first motor assembly, the second motor assembly and the third motor assembly to work based on the tracking information, so that to adjust the position of the photographing device clamped by the clamping assembly in real time. The photographing device can keep tracking the target object for photographing to achieve a better photographing effect.

BRIEF DESCRIPTION OF THE DRAWINGS

To describe the technical solutions in the present disclosure more clearly, the following briefly introduces the drawings describing the embodiments. Apparently, the drawings in the following description show some embodiments of the present disclosure. Other drawings may also be obtained by a person of ordinary skill in the art after reading the present disclosure.

REFERENCE NUMERALS

100. gimbal; 200. photographing device; 10. handle assembly;
20. first motor assembly; 21. heading shaft motor; 22. heading arm;
30. second motor assembly; 31. transverse roller motor; 32. connection arm;
40. third motor assembly; 41. pitch shaft motor; 411. stator end; 412. rotor end; 42. pitch arm; 43. straight force arm; 44. second connection portion;
50. clamping assembly;
60. target tracking assembly; 61. housing. 62. vision module. 63. wireless positioning module. 64. fill-in light module; 65. first connection portion.

DETAILED DESCRIPTION OF THE EMBODIMENTS

Unless otherwise defined, all technical and scientific terms used herein have the same meanings as are commonly understood by those skilled in the art of the present invention. The terms used herein in the specification are only for the purpose of describing specific embodiments and are not intended to limit the invention, for example, orientation or position indicated by the terms “length”, “width”, “upper”, “lower”, “left”, “right”, “front”, “rear”, “vertical”, “horizontal”, “top”, “bottom”, “inside”, “outside”, etc. are based on the drawings and are merely for ease of description, shall not be construed as a limitation on the technical solution of the present invention.

The terms “comprising” and “having” and any variations thereof in the specification, claims and above description of the drawings of the present disclosure are intended to cover non-exclusive inclusions. The terms “first”, “second” and the like in the specification, claims and drawings of the present disclosure are used to distinguish different objects, while not used to describe a specific order. “A plurality of” means two or more, unless otherwise expressly and specifically defined.

In the specification, claims and description of the drawings of the present disclosure, when an element is referred to be “fixed to”, “mounted to”, “disposed to” or “connected to” another element, it may be located directly or indirectly on the other element. For example, when an element is said to be “attached” to another element, it may be directly or indirectly connected to the other element.

Furthermore, the reference herein to “an embodiment” means that specific features, structures or characteristics described in the embodiments may be included in at least one embodiment of the present disclosure. When the phrase appears in various positions of the specification, it does not necessarily refer to the same embodiment and is not an independent or alternative embodiment mutually exclusive with other embodiments. It is explicitly and implicitly understood by those skilled in the art that the embodiments described herein may be combined with other embodiments.

An embodiment of the present disclosure provides a gimbal 100. The gimbal 100 is configured to hold a fixed photographing device 200, wherein the photographing device 200 may be a mobile phone, a camera or the like, which is not limited in the present disclosure.

Figure 1:
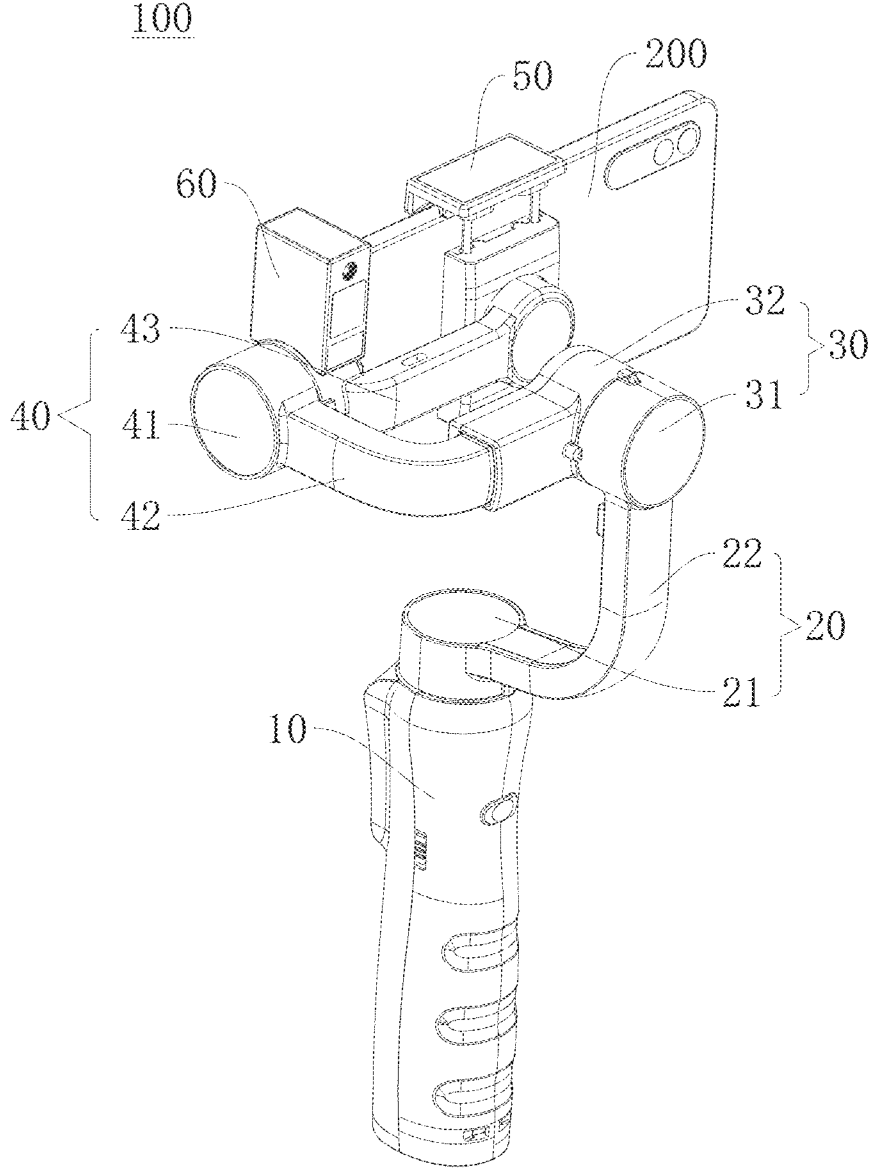
FIG. 1 is a schematic structural diagram 1 of the gimbal according to one embodiment of the present disclosure, wherein the target tracking assembly is installed on the third motor assembly
Figure 2:
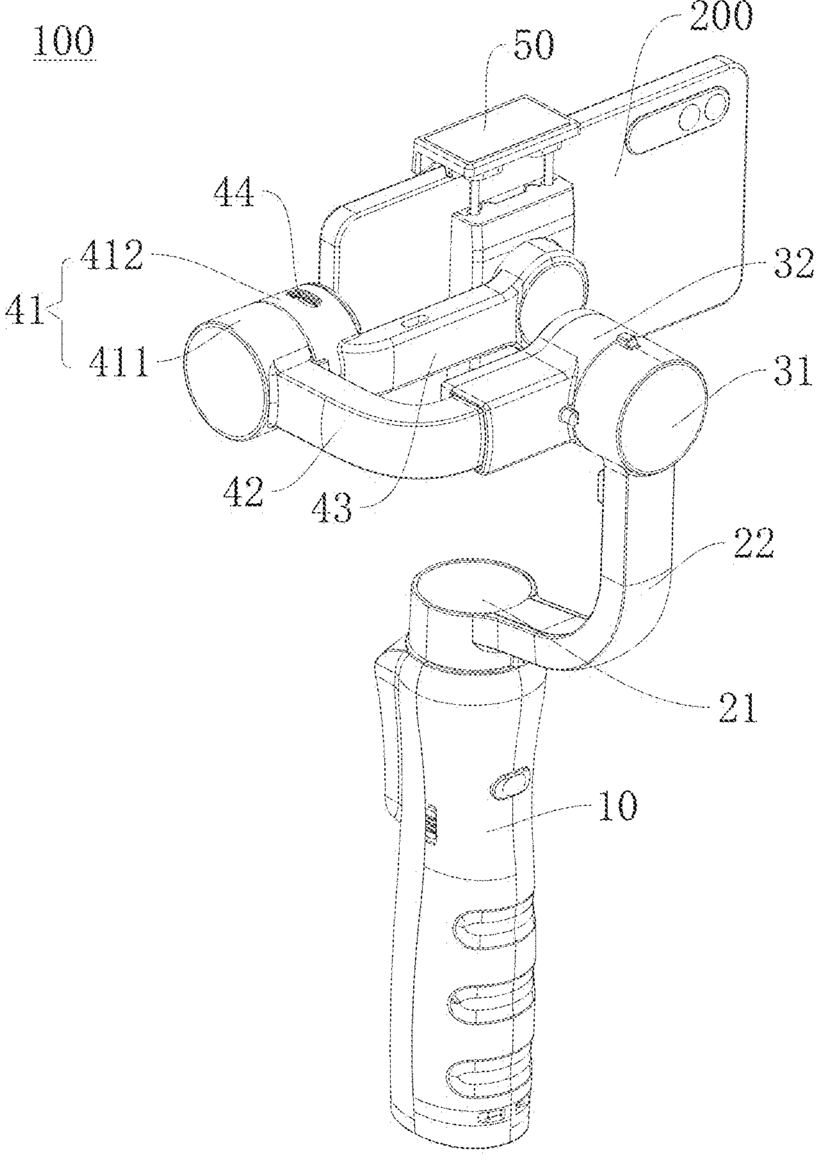
FIG. 2 is a schematic structural diagram 2 of the gimbal according to one embodiment of the present disclosure, wherein the target tracking assembly is not installed on the third motor assembly
Figure 3:
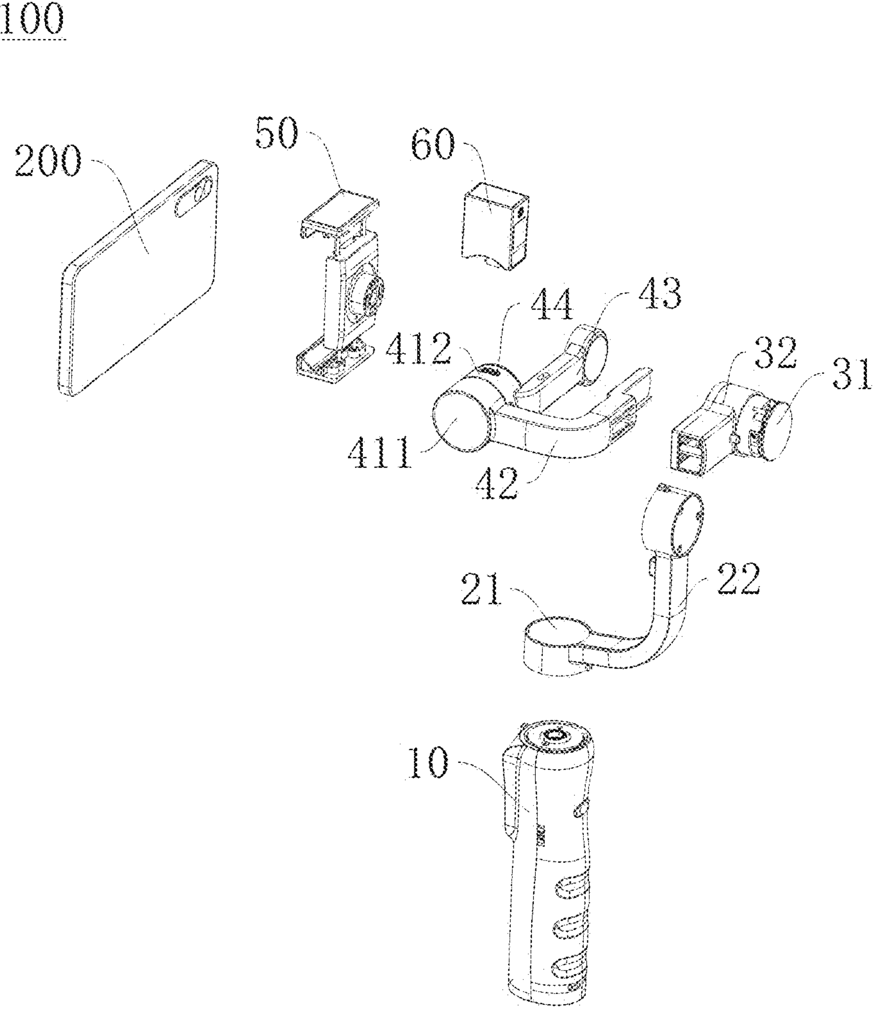
FIG. 3 is a schematic exploded diagram of the gimbal in FIG. 1
Figure 4:
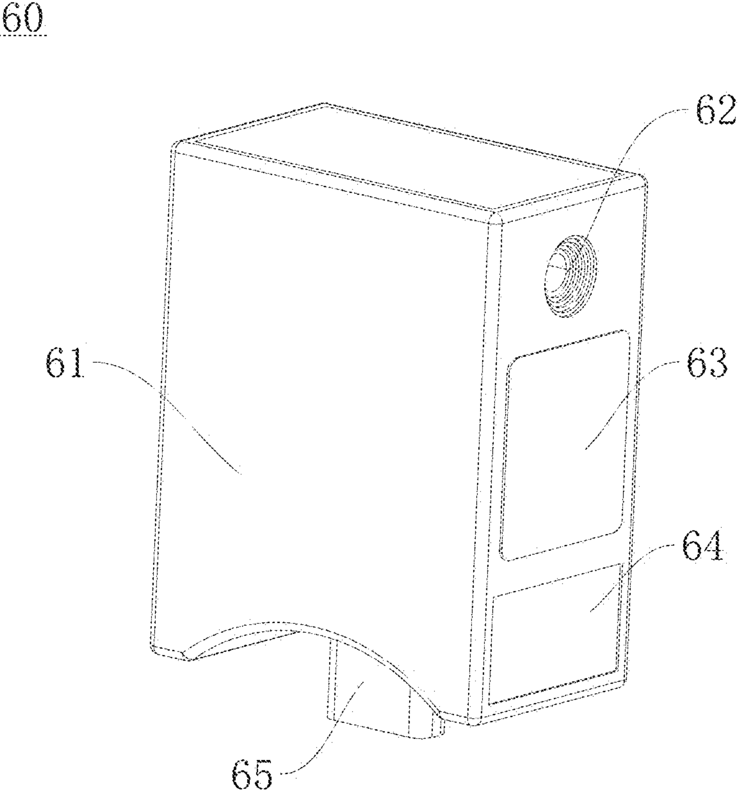
FIG. 4 is a schematic structural diagram of the target tracking assembly in FIG. 3

As shown in FIG. 1 to FIG. 3, the gimbal 100 comprises a handle assembly 10, a first motor assembly 20, a second motor assembly 30, a third motor assembly 40, a control assembly (not shown in the figure), a target tracking assembly 60 and a clamping assembly 50 configured to clamp the photographing device 200. The handle assembly 10 is vertical to facilitate holding and performing an operation by user.

In addition, to achieve multi-dimensional photographing angle adjustment of the gimbal 100, the first motor assembly 20 is installed at one end of the handle assembly 10, the second motor assembly 30 is installed at one end of the first motor assembly 20 and away from the handle assembly 10, the third motor assembly 40 is installed at one end of the second motor assembly 30 and away from the first motor assembly 20, the clamping assembly 50 is installed on the third motor assembly 40, the control assembly is installed in the handle assembly 10 and is connected to the first motor assembly 20, the second motor assembly 30 and the third motor assembly 40.

It should be noted that the first motor assembly 20 is configured to drive the photographing device 200 to rotate along the axial direction of the first motor assembly 20, the second motor assembly 30 is configured to drive the photographing device 200 to rotate along the axial direction of the second motor assembly 30, the third motor assembly 40 is configured to drive the photographing device 200 to rotate along the axial direction of the third motor assembly 40.

In some embodiment, the first motor assembly 20 comprises a heading shaft motor 21 and a heading arm 22. The heading shaft motor 21 is installed on the top end of the handle assembly 10 and is connected to the control assembly, one end of the heading arm 22 is fixedly connected to the output of the heading shaft motor 21. The second motor assembly 30 comprises a transverse roller motor 31 and a connecting arm 32. The transverse roller motor 31 is installed on one end of the heading arm 22 away from the heading shaft motor 21 and is connected to the control assembly. One end of the connecting arm 32 is fixedly connected to the output of the transverse roller motor 31.

In addition, the third motor assembly 40 comprises a pitching shaft motor 41, a pitching arm 42 and a straight force arm 43. The pitching shaft motor 41 comprises a rotor end 412 and a stator end 411, one end of the pitching arm 42 is slidably mounted on one end of the connecting arm 32 and away from the transverse roller motor 31. The stator end 411 is fixedly mounted to the other end of the pitching arm 42 and is connected to the control assembly, the rotor end 412 is rotatably mounted to the stator end 411. One end of the straight arm 43 is connected to the rotor end 412, the clamping assembly 50 is mounted on one end of the straight arm 43 away from the rotor end 412.

It can be understood that, when the heading shaft motor 21 works, the heading shaft motor 21 can drive the heading arm 22 to rotate along the axial direction of the first motor assembly 20, that is to drive the photographing device 200 to rotate along the axial direction of the first motor assembly 20. When the transverse roller motor 31 works, the transverse roller motor 31 can drive the connecting arm 32 to rotate along the axial direction of the second motor assembly 30, that is to drive the photographing device 200 to rotate along the axial direction of the second motor assembly 30. When the third motor assembly 40 works, the rotor end 412 in the pitch axis motor 41 can drive the straight force arm 43 to rotate along the axial direction of the third motor assembly 40, that is to drive the photographing device 200 to rotate along the axial direction of the third motor assembly 40.

Therefore, in one aspect, the gimbal 100 can firmly fix the photographing device 200 on the gimbal 100 by the clamping component 50, ensuring stability and security during photographing process. In another aspect, the gimbal 100 can adjust a photographing angle of the photographing device 200 in multiple dimensions by setting the first motor assembly 20, the second motor assembly 30 and the third motor assembly 40, so that to meet requirements of different scenarios and improve user experience.

In addition, as shown in FIG. 1 to FIG. 3, to achieve tracking and photographing of a target object by the gimbal 100, the target tracking assembly 60 is mounted on the third motor assembly 40 and is connected to the control assembly, so as to obtain tracking information (for example, the position, trajectory and other relevant information) of the target object (not shown in the figure). The control assembly can control rotation of the first motor assembly 20, the second motor assembly 30 and the third motor assembly 40 according to the tracking information obtained by the target tracking assembly 60, so that the photographing device 200 clamped by the clamping assembly 50 can keep tracking the target object to perform photographing.

In some embodiment, the target tracking assembly 60 is mounted on the straight force arm 43. When a moving target object needs to be photographed, the gimbal 100 can obtain tracking information of the target object in real time by the target tracking assembly 60 and transfer the tracking information to the control assembly. Then the control assembly controls the heading axis motor 21, the transverse roller motor 31 and the pitch axis motor 41 to work based on the tracking information, so that to adjust the position of the photographing device 200 in real time to ensure that the photographing device 200 can keep tracking the target object for photographing.

In conclusion, comparing with the prior art, the gimbal 100 can obtain tracking information from the target tracking assembly 60 in real time and control the first motor assembly 20, the second motor assembly 30 and the third motor assembly 40 to work. The position of the photographing device 200 clamped by the clamping component 50 can be adjusted in real time so that to ensure that the photographing device 200 can keep tracking the target object for photographing and achieve a better photographing effect.

To help a person skilled in the art better understand the present disclosure, the following clearly and completely describes the technical solutions in the embodiments of the present disclosure with reference to FIG. 1 to FIG. 4.

Further, in some embodiments of the present disclosure, as shown in FIG. 1 to FIG. 4, the target tracking assembly 60 comprises a vision module 62 and a housing 61 provided with a through hole (not shown in the figure). The housing 61 is detachably mounted on the third motor assembly 40 to provides protection and support for the vision module 62. In addition, the vision module 62 is installed in the housing 61 and connected to the control assembly. The vision module 62 can obtain tracking information of the target object through the through hole.

It can be understood that, when photographing a moving target object, the vision module 62 obtains a photographed picture by using the through hole on the housing 61 firstly, then processes and analyzes the obtained image so that to identify position, trajectory and other related information of the target object. The tracking information is transmitted to the control assembly, the control assembly controls the heading axis motor 21, the lateral roller motor 31 and the pitch axis motor 41 to work based on the tracking information so that to adjust the position of the photographing apparatus 200. Thus, to ensure that the photographing apparatus 200 can keep tracking the target object for photographing, so that to achieve a better photographing effect.

Preferably, the vision module 62 is a camera module. In another embodiment, the vision module 62 may also be another proper image collection module, which is not limited in the present disclosure. A person skilled in the art may select the image collection module according to an actual situation.

In some embodiments of the gimbal 100 provided in the present disclosure, to ensure accuracy and consistency of target tracking, the camera orientation of the vision module 62 is the same with the camera orientation of the photographing device 200. In other words, the camera of the vision module 62 and the camera of the photographing device 200 have similar field of view and angle of view. The vision module 62 can capture the same picture as the photographing device 200.

Therefore, it can be ensured that the image obtained by the vision module 62 is consistent with the image photographed by the photographing device 200, so that the vision module 62 can accurately analyze and track the target object in the photographed picture, provide accurate tracking information to the control assembly. This avoids problem that the image obtained by the vision module 62 does not match the actual photographed image, and thus affects accuracy of target tracking.

Further, in some embodiments of the gimbal 100 provided in the present disclosure, as shown in FIG. 1 to FIG. 4, to further improve accuracy of target tracking of the gimbal 100, the target tracking assembly 60 further comprises a wireless positioning module 63 at the bottom of the vision module 62. The wireless positioning module 63 is installed in the housing 61 and is connected to the control assembly.

When the communication device in the target object sends a communication signal, the wireless positioning module 63 can receive the communication signal and perform wireless communication with the target object to obtain tracking information.

It may be understood that, when the communications device in the target object sends a communication signal, the wireless positioning module 63 can receive the communication signal, calculate and determine position, orientation and motion status of the target object, that is, tracking information and transmit the obtained tracking information to the control assembly.

It should be noted that, the gimbal 100 is provided with a wireless positioning module 63 so that functions and flexibility of the target tracking assembly 60 are enhanced. Specifically, in addition to obtaining tracking information of the target object by the vision module 62, the target tracking assembly 60 can obtain position and motion information of the target object by wireless communication between the wireless positioning module 63 and the target object, thereby providing a more comprehensive and reliable target tracking function for the gimbal 100 and provide better photographing experience and effects for users.

Further, in some embodiments of the gimbal 100 provided in the present disclosure, to ensure stability and reliability of wireless communication, the antenna orientation of the wireless positioning module 63 is the same as the camera orientation of the photographing device 200. In other words, the antenna of the wireless positioning module 63 and the camera of the photographing device 200 have similar directions and angles to maintain good signal transmission during target tracking.

It should be noted that, the antenna orientation of the wireless positioning module 63 to be same as the camera orientation of the photographing device 200 can minimize the interference and attenuation in signal transmission. Specifically, when there is an obstacle or signal attenuation between the photographing device 200 and the target object, the antenna orientation of the wireless positioning module 63 to be same as the camera orientation of the photographing device 200 can provide better signal receiving and transmission capabilities.

In addition, the antenna orientation of the wireless positioning module 63 to be same as the lens orientation of the photographing device 200 can further improve overall consistency and coordination of the system. By keeping the antenna and the camera oriented in a same direction, data consistency between wireless communication and visual tracking can be ensured, thereby improving performance and reliability of the entire target tracking assembly 63.

Preferably, in some embodiments, the wireless positioning module 63 is an ultra-wideband positioning module. It should be noted that the wireless positioning module 63 uses an ultra-wideband (Ultra-Wideband, UWB) positioning technology. UWB is a wireless communication technology which uses the short pulse transmission of ultra-wideband signals in time domain to achieve high precision positioning and tracking.

It should also be noted that, on the one hand, the UWB technology can provide sub centimeter level positioning precision, realize high precision measurement and tracking of the target position. On the other hand, the broadband characteristics of UWB signal make it have good ability to suppress multipath propagation and interference and can realize reliable positioning in complex environment.

In addition, UWB technology supports high-speed data transmission and enable fast position updates and communication. UWB technology has relatively low energy consumption during transmission which help to extend the battery life of the device.

Further, in some embodiments of the gimbal 100 provided in the present disclosure, as shown in FIG. 1 to FIG. 4, the target tracking assembly 60 further comprises a fill-in light module 64 at the bottom of the wireless positioning module 63. The fill-in light module 64 is installed in the housing 61 and is configured to illuminate the target object to improve photographing effect of the photographing apparatus 200.

It can be understood that, when the target object is in an environment with insufficient light or backlight, the user may turn on the fill-in light module 64 to provide proper illumination and ensure that the target object can obtain sufficient light in a photographing process. Thus, a clearer and brighter image or video can be obtained and better photographing effect can be achieved.

It should be noted that the fill-in light module 64 usually uses a LED lamp or another type of lighting device. The fill-in light module 64 has the function of adjusting luminance and color temperature to adapt to different photographing scenarios and requirements. It may be automatically or manually adjusted according to the illumination conditions of the photographing environment to achieve an optimal illumination effect. It is not limited by the present disclosure and may be selected by a person skilled in the art according to actual conditions.

Further, in some embodiments of the gimbal 100 provided in the present disclosure, to ensure an optimal light fill-in effect, the light emitting surface of the fill-in light module 64 is oriented in the same direction of the photographing device 200. In other words, the light emitting surface of the fill-in light module 64 has a similar direction and angle to the camera of the photographing device 200 to provide an optimal illumination effect in photographing process.

It can be understood that, the light emitting surface of the fill-in light module 64 to be oriented in the same direction as the camera of the photographing device 200 ensure that light can be directly illuminated on the target object to reduce the problem of shadow and uneven light. This provides a more well-distributed, natural lighting effect and makes the image or video clearer and brighter.

Further, in some embodiments of the gimbal 100 provided in the present disclosure, as shown in FIG. 1 and FIG. 2, to realize multi-dimensional photographing angle adjustment of the photographing device 200, the axial direction of the first motor assembly 20, the axial direction of the second motor assembly 30 and the axial direction of the third motor assembly 40 are different.

Preferably, in some embodiments, the axis direction of the first motor assembly 20, the axis direction of the second motor assembly 30 and the axis direction of the third motor assembly 40 are perpendicular to each other. It should be noted that, the stability and precision of the gimbal 100 can be improved by foregoing technical solution. Specifically, by making the axes direction perpendicular to each other, mutual interference between motions can be reduced and mutual influence of motions on different axes can be avoided. Thus, the movements of the photographing apparatus 200 are more accurate and reliable and the photographing and tracking effects are stable.

Further, in some embodiments of the gimbal 100 provided in the present disclosure, as shown in FIG. 1 to FIG. 3, a first connection portion 65 is disposed on the target tracking assembly 60, a second connection portion 44 cooperating with the first connection portion 65 is disposed on the third motor assembly 40. The target tracking assembly 60 is fixedly mounted on the third motor assembly 40 by cooperating of the first connection portion 65 and the second connection portion 44, the target tracking assembly is electrically connected to the control assembly.

In some embodiments, the first connection portion 65 is a plug protruded on the housing 61, a first electrical connector (not shown in the figure) is disposed in the plug, the second connection portion 44 is a socket adapted to the plug. The socket is recessed on the straight force arm 43 or the rotor end 412, a second electrical connector (not shown) is arranged in the socket. When the target tracking assembly 60 is mounted on the third motor assembly 40, the plug is inserted into the socket and the first electrical connector is electrically connected to the second electrical connector.

In some embodiments, the target tracking assembly 60 and the third motor assembly 40 may alternatively be detached and connected by using a magnetic suction structure, corresponding electrical connectors are disposed on the target tracking assembly 60 and the third motor assembly 40 respectively. This is not limited in the present disclosure. A person skilled in the art may select an electrical connector according to an actual situation.

In some embodiments, the distance between the target tracking assembly 60 and the camera of the photographing device 200 is less than or equal to a preset threshold. The target tracking assembly 60 is oriented in a same direction as the camera orientation of the photographing device. The target tracking assembly 60 comprises a detection module, a positioning module and a position adjusting module, the detection module is configured to receive orientation information of the target tracking assembly and to obtain first detection information. The positioning module is configured to: when it is determined that the first feature recognition information of the target object exists according to the first detection information, obtain the biometric feature recognition information of the target object; when the biometric feature recognition information matches the preset biometric feature recognition information, determine a position of a target part based on the position of the biometric feature recognition information in the field of view and determine position information of the target object based on the position of the target part. The first feature recognition information is the feature information of the target object in a specific posture; the biometric feature information is at least one of facial feature information, fingerprint feature information and iris feature information. The position adjustment module is configured to send a tracking movement instruction to the control assembly based on the position information, so that the control assembly performs position adjustment control based on the position information and the camera of the photographing device 200 oriented towards the target object.

In some embodiments, the distance between the target tracking assembly 60 and the camera of the photographing device 200 should be less than or equal to the preset distance threshold to ensure that the distance between the target tracking assembly 60 and the camera of the photographing device 200 is close enough. That the distance is close enough means that the target tracking assembly 60 can be as close as possible to the camera so long as normal photographing of the camera is not affected. Specifically, the distance between the target tracking assembly 60 and the camera of the photographing device 200 is a distance between an edge of the target tracking assembly 60 and an edge of the camera. When the preset distance threshold is 0, it means that the target tracking assembly 60 is disposed at an edge position of the camera and does not exactly block a field of view of the camera so that to ensure that the camera can perform shooting normally.

The distance between the target tracking assembly 60 and the camera may be adjusted according to the distance between the photographing device 200 and the photographed object. Further, the preset distance threshold may be determined by multiplying the distance between the photographing device 200 and the photographed object by a set coefficient (for example, 0.1) and flexibly adjusting the distance between the target tracking assembly 60 and the camera according to an actual situation. Thus, to ensure that the target tracking system implemented effectively at different photographing distances.

In some embodiments, the detection module is responsible for obtaining detection information of the target object, where the detection information is data acquired by a vision sensor, a voice sensor or other sensor used to identify the existence and features of the target object. The detection module is preferably a sensor, including a camera, a voice sensor and the like. The detection module is configured to capture information about a target object.

The detection module further comprises a data processing unit that is responsible for processing data obtained by the sensor and extracting feature information, a control interface that is configured to communicate with the positioning module and the position adjustment module to transmit feature information of the target object.

In some embodiments, the positioning module determines the position information of the target object based on the feature information provided by the detection module, to provide basic data for position adjustment. The positioning module is preferably a processor chip or a functional module in a general control chip.

In some embodiments, the position adjustment module adjusts the position of the camera of the tracking device based on the position information provided by the positioning module and the executing mechanism in the control system to ensures that the camera or the tracking device faces the target object. The position adjusting module is preferably a processor chip and may also be integrated with the positioning module to form a general control chip.

Figure 5:
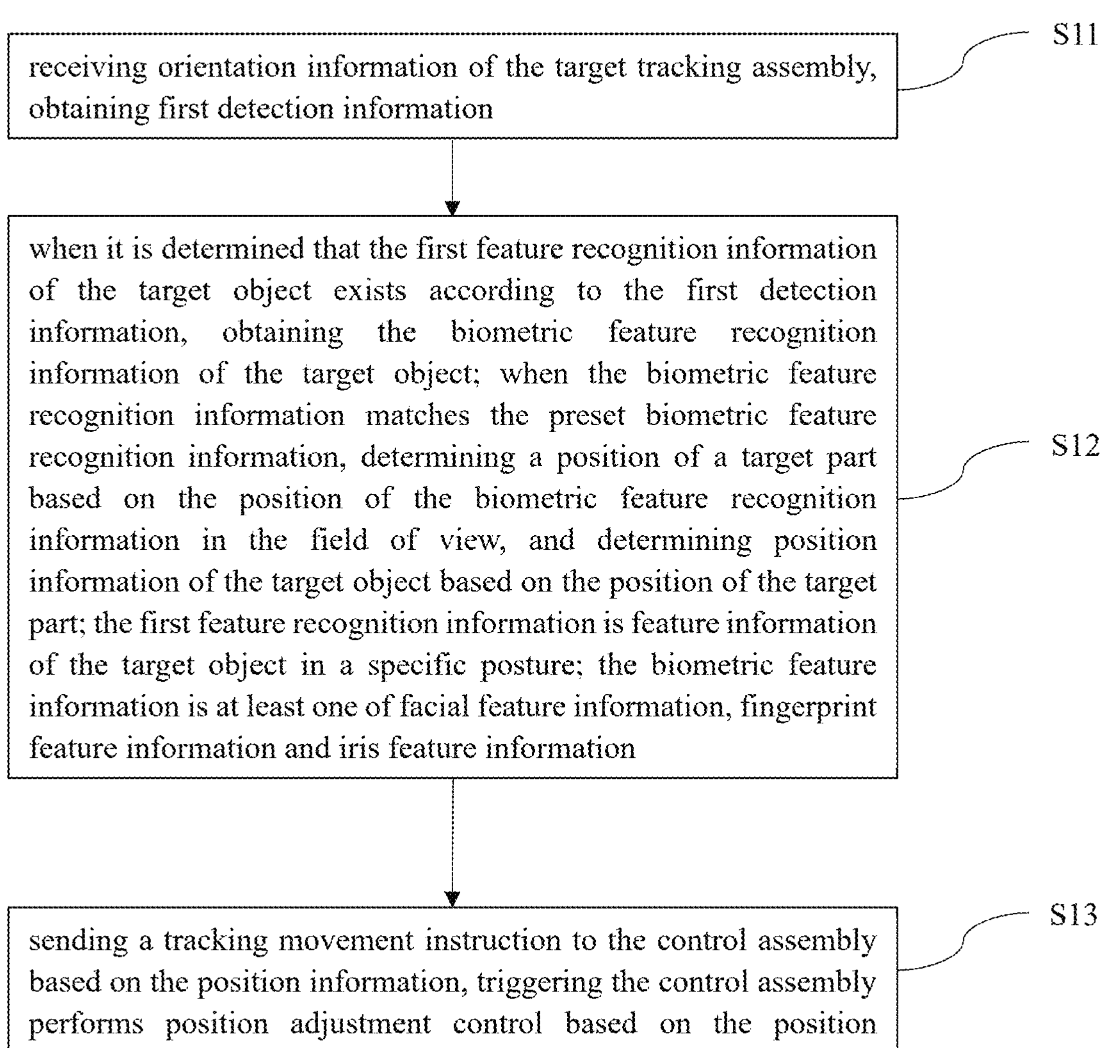
FIG. 5 is a schematic flowchart of the tracking method of the gimbal according to one embodiment of the present disclosure

As shown in FIG. 5, a tracking method for the gimbal 100 is provided. The tracking method is applied to the gimbal 100. The distance between the target tracking assembly 60 of the gimbal 100 and the camera of the photographing device 200 is less than or equal to a preset distance threshold. The target tracking assembly 60 is oriented in the same direction as the camera orientation. The tracking method comprises:

- S11: receiving orientation information of the target tracking assembly 60, obtaining first detection information;
- S12: when it is determined that the first feature recognition information of the target object exists according to the first detection information, obtaining the biometric feature recognition information of the target object; when the biometric feature recognition information matches the preset biometric feature recognition information, determining a position of a target part based on the position of the biometric feature recognition information in the field of view and determining position information of the target object based on the position of the target part; the first feature recognition information is feature information of the target object in a specific posture; the biometric feature information is at least one of facial feature information, fingerprint feature information and iris feature information;
- S13: sending a tracking movement instruction to the control assembly based on the position information, triggering the control assembly performs position adjustment control based on the position information, so that the camera of the photographing device 200 oriented towards the target object.

In some embodiments, the target tracking assembly 60 receives the detection information of the orientating position as the first detection information. The first detection information is then used as the visual tracking component to obtain information such as a picture or a video. The first feature recognition information of the target object is determined based on the first detection information. The first feature recognition information may include feature information such as a status, a posture and an action of the target object.

The target tracking assembly 60 obtains the position information of the target object when the first feature recognition information exists. Then the target tracking assembly 60 sends a movement tracking instruction to the control assembly based on the position information. The movement tracking instruction triggers the control assembly to adjust a position based on the position information, so that the camera orientates to the target object. The control assembly adjusts the positions and angles of the target tracking assembly 60 and the photographing device 200 according to the received instruction so that to ensure that the target object is oriented.

According to the status of the target object, the tracking instruction is sent only when the position changes so that to reduce the quantity of interactions between the target tracking assembly 60 and the control assembly. Thus, the efficiency is improved. Target tracking is realized by using the gimbal 100 without cooperation of a specific APP. Even when the target tracking assembly 60 is fixed on the clamping assembly 50, target tracking can be realized without the photographing device 200, thereby improving tracking efficiency.

The facial feature information may be obtained by using a camera. The face image is captured by using a high-resolution camera. The facial recognition algorithm is used to detect the face and extract feature points, extract features from the face image, such as the facial contour, eye position and mouth shape. The extracted features are converted into digital codes for subsequent comparison and recognition.

The method of obtaining the fingerprint feature information comprises: preprocessing the fingerprint image including operations such as denoising and enhancement; extracting features such as fingerprint pattern, ridge and valley. Then the extracted fingerprint features are converted into a digital template for subsequent comparison and recognition.

The method of obtaining iris feature information comprises: obtaining an iris image; preprocessing the iris image including removing eyeball movement, locating pupils and the like; extracting features from the iris image, for example, texture, punctures and the like; and converting the extracted iris features into a digital template which is used for subsequent comparison and identification.

Figure 6:
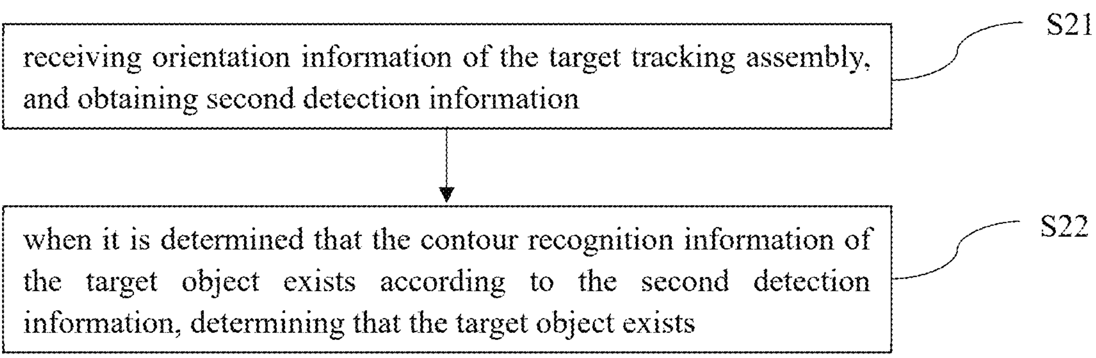
FIG. 6 is a schematic flowchart of the steps before receiving the orientation information of the target tracking assembly and obtaining first detection information according to one embodiment of the present disclosure

In some embodiments, referring to FIG. 6, before receiving orientation information of the target tracking assembly 60 and obtaining first detection information, the gimbal tracking method further comprises:

- S21: receiving orientation information of the target tracking assembly 60 and obtaining second detection information;
- S22: when it is determined that the contour recognition information of the target object exists according to the second detection information, determining that the target object exists.

Figure 7:
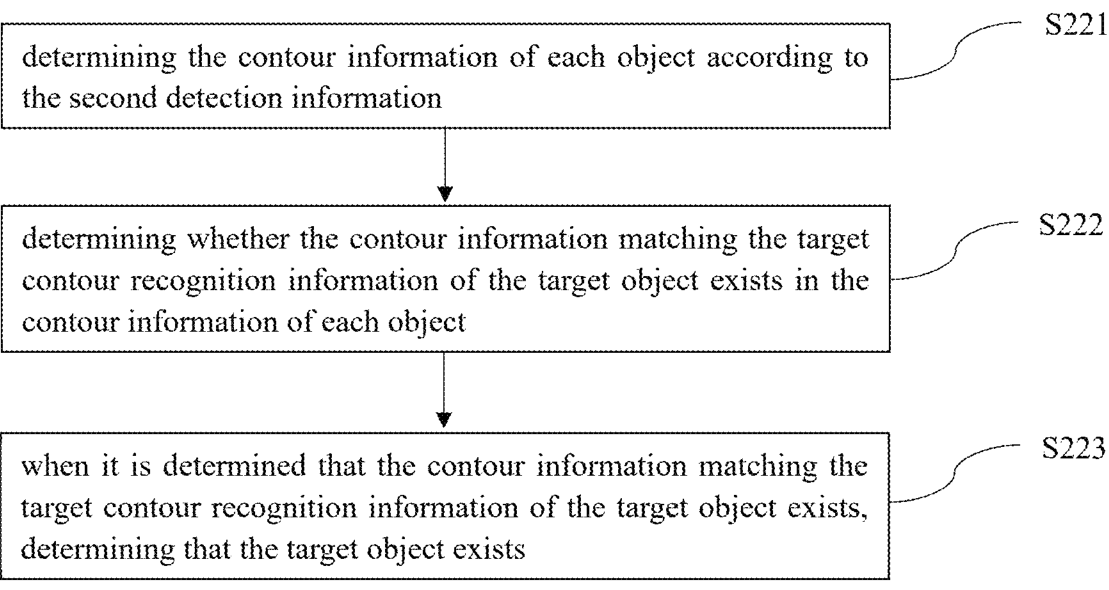
FIG. 7 is a schematic flowchart of the steps of determining that the target object exists when it is determined that the contour recognition information of the target object exists according to the second detection information according to one embodiment of the present disclosure

In some embodiments, referring to FIG. 7, when it is determined that the contour recognition information of the target object exists according to the second detection information, determining that the target object exists comprising:

- S221: determining the contour information of each object according to the second detection information;
- S222: determining whether the contour information matching the target contour recognition information of the target object exists in the contour information of each object;
- S223: when it is determined that the contour information matching the target contour recognition information of the target object exists, determining that the target object exists.

The target tracking assembly 60 performs contour analysis for each object (which may be various regions having contours) in the second detection information to determine whether contour information matching the target contour recognition information exists in the object. When the target tracking assembly 60 determines that the contour information matching the target contour recognition information exists, that is, it is found that the contour of an object in the second detection information matches the contour feature of the target object, determines that the target object exists in the field of view of the target tracking assembly 60. For example, the target object is a person A, the target tracking assembly 60 performs matching analysis based on contour information of each object in the second detection information and determines whether contour information matching the target contour recognition information of the person A exists. Once the existence of the matching contour information is found, it is determined that the person A exists within the field of view of the target tracking assembly 60.

Figure 8:
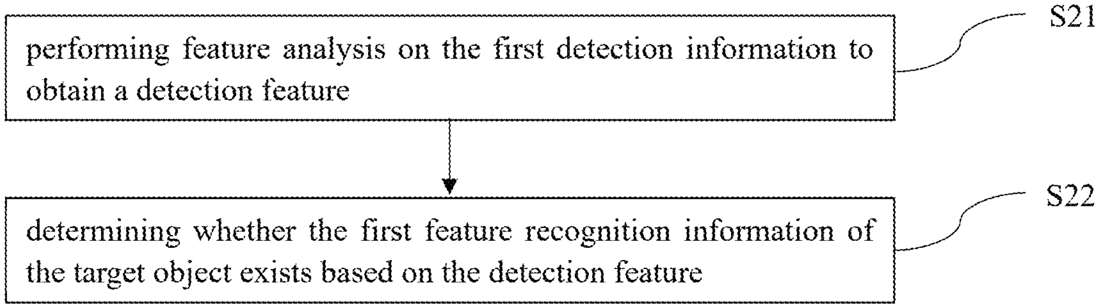
FIG. 8 is a schematic flowchart of the steps before obtaining the biometric feature recognition information of the target object when it is determined that the first feature recognition information of the target object exists according to the first detection information according to one embodiment of the present disclosure

As shown in FIG. 8, before obtaining the biometric feature recognition information of the target object when it is determined that the first feature recognition information of the target object exists according to the first detection information, the gimbal tracking method further comprises:

S31: performing feature analysis on the first detection information to obtain a detection feature;

S32: determining whether the first feature recognition information of the target object exists based on the detection feature.

Specifically, the first detection information obtained may be various data about the target object, such as position, moving direction and appearance. Feature analysis is performed on the first detection information. Key detection features, such as a motion feature, a shape feature and a color feature, are extracted.

By comparing the detection feature with the first feature identification information of the target object, it is determined whether a match exists. If the detection feature matches the first feature recognition information of the target object, it may be determined that the target object exists.

Figure 9:
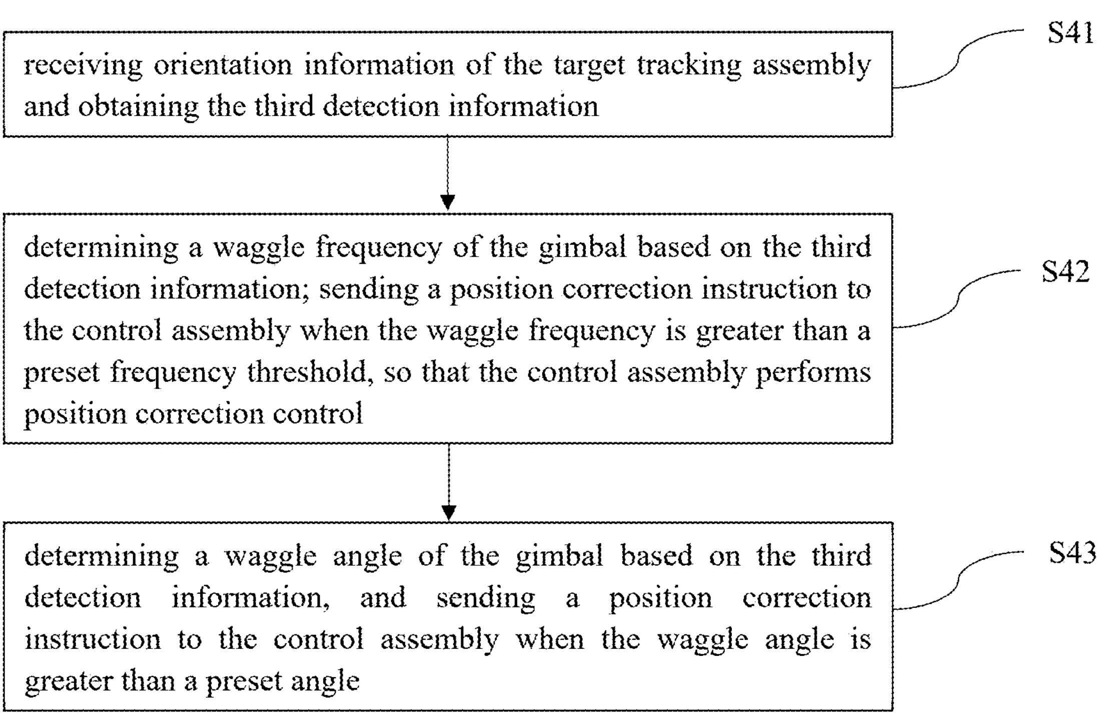
FIG. 9 is a schematic flowchart of the steps before receiving orientation information of the target tracking assembly and obtaining the first detection information according to one embodiment of the present disclosure

As shown in FIG. 9, before receiving orientation information of the target tracking assembly 60 and obtaining the first detection information, the gimbal tracking method further comprises:

S41: receiving orientation information of the target tracking assembly 60 and obtaining the third detection information;

S42: determining a waggle frequency of the gimbal 100 based on the third detection information; sending a position correction instruction to the control assembly when the waggle frequency is greater than a preset frequency threshold, so that the control assembly performs position correction control;

and/or, S43: determining a waggle angle of the gimbal based 100 on the third detection information and sending a position correction instruction to the control assembly when the waggle angle is greater than a preset angle threshold, so that the control assembly performs position correction control.

Specifically, step S41 is intended to obtain orientation information of the target tracking assembly 60 at a specific moment, so that to subsequently determine and correct the waggle frequency or angle according to the information. Step S42 is intended to detect the waggle frequency of the gimbal 100. If the frequency exceeds the preset threshold, the system automatically sends a position correction instruction to the control assembly, so that to adjust the position of the gimbal 100 and ensure stable target tracking. Step S43 is like step S42. However, the waggle angle of the gimbal 100 is detected and corrected. If the angle exceeds a preset threshold, the system sends a position correction instruction to the control assembly, so that to adjust the position of the gimbal 100 and ensure stable target tracking.

The purpose of both step S42 and step S43 is to monitor a waggle condition of the gimbal 100 during the tracking process and perform position correction when the frequency or angle exceeds the preset threshold so that to ensure accuracy and stability of target tracking. Real-time monitoring and adjustment can improve the performance of the system and make the target tracking process more reliable and efficient.

Figure 10:
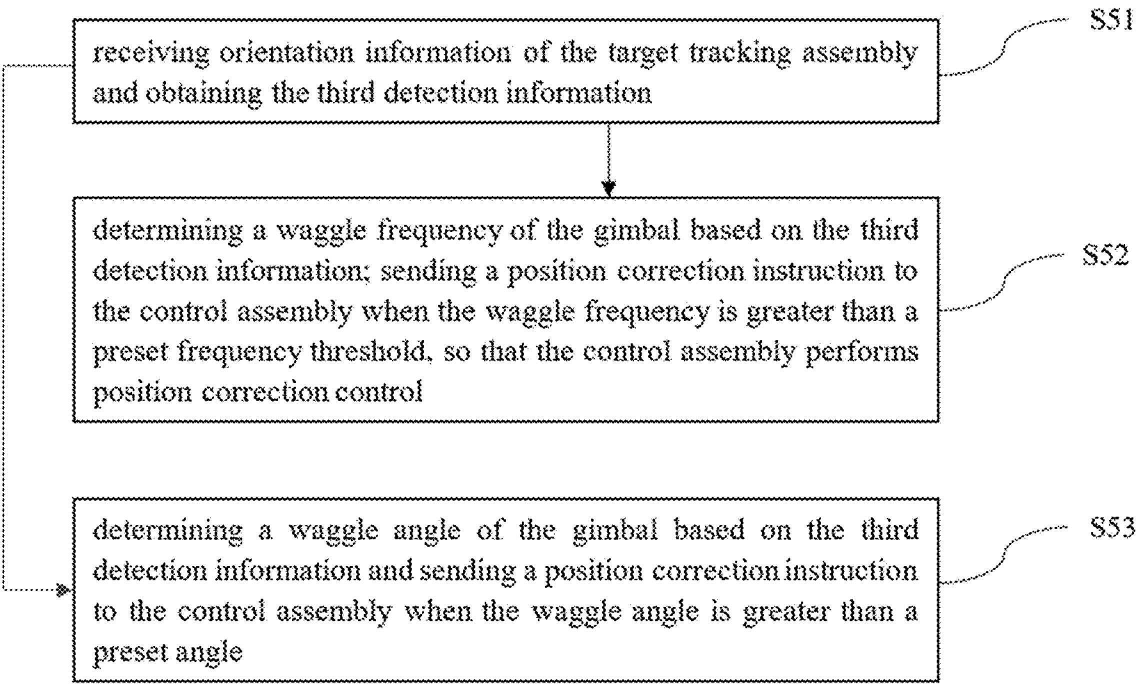
FIG. 10 is a schematic flowchart of the steps before receiving orientation information of the target tracking assembly and obtaining the second detection information according to one embodiment of the present disclosure

As shown in FIG. 10, before receiving orientation information of the target tracking assembly and obtaining the first detection information, the gimble tracking further comprises:

S51: receiving orientation information of the target tracking assembly 60 and obtaining the third detection information;

S52: determining a waggle frequency of the gimbal 100 based on the third detection information; sending a position correction instruction to the control assembly when the waggle frequency is greater than a preset frequency threshold, so that the control assembly performs position correction control;

and/or,

S53: determining a waggle angle of the gimbal 100 based on the third detection information and sending a position correction instruction to the control assembly when the waggle angle is greater than a preset angle threshold, so that the control assembly performs position correction control.

Specifically, step S51 is intended to obtain the orientation information about the target tracking assembly 60 at a specific moment so that to subsequently determine and correct the waggle frequency or angle according to the information.

Step S52 is intended to determine the waggle frequency of the gimbal 100 based on the third detection information. When the waggle frequency exceeds the preset frequency threshold, the system automatically sending a position correction instruction to the control assembly. The control assembly performs position correction control to adjust the position of the gimbal 100 so that to ensure stable target tracking.

Step S53 is intended to determine the waggle angle of the gimbal 100 based on the third detection information. When the waggle angle exceeds the preset angle threshold, sending a position correction instruction to the control assembly. The control assembly performs position correction control. Step S53 is like step S52. However, the waggle angle of the gimbal 100 is detected and corrected. If the angle exceeds a preset threshold, the system sends a position correction instruction to the control assembly so that to adjust the position of the gimbal 100 and ensure stable target tracking.

An objective of above embodiment is to monitor the waggle condition of the gimbal 100 in a tracking process and perform position correction when the frequency or angle exceeds a preset threshold so that to ensure accuracy and stability of target tracking. Real-time monitoring and adjustment help improve system performance and make the target tracking process more reliable and efficient.

Figure 11:
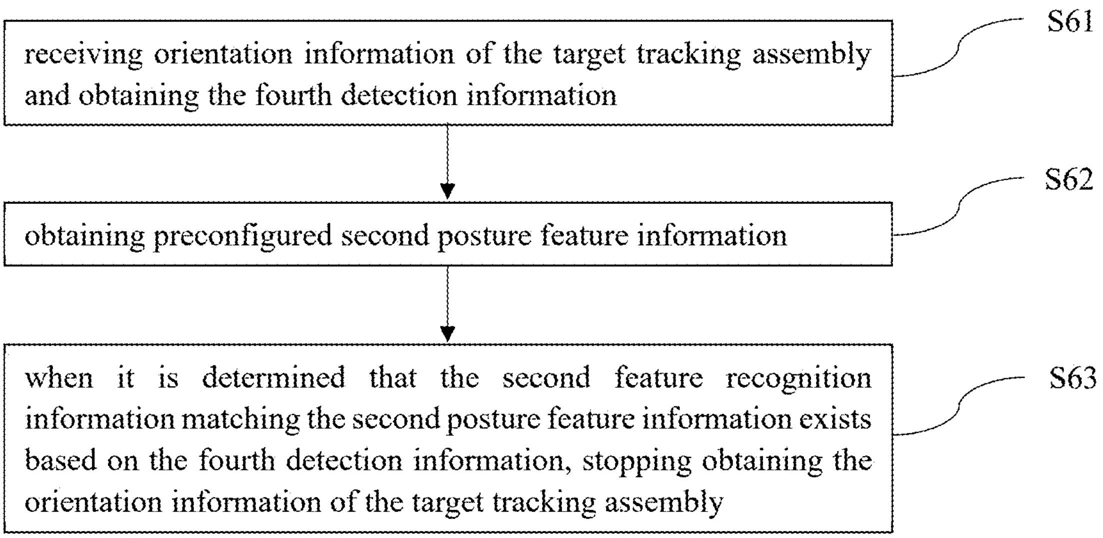
FIG. 11 is a schematic flowchart of the steps of triggering the control assembly performs position adjustment control based on the position information according to one embodiment of the present disclosure

As shown in FIG. 11, after sending a tracking movement instruction to the control assembly based on the position information, triggering the control assembly performs position adjustment control based on the position information, so that the camera of the photographing device oriented towards the target object, the gimble tracking method further comprises:

S61: receiving orientation information of the target tracking assembly 60 and obtaining the fourth detection information;

S62: obtaining preconfigured second posture feature information;

S63: when it is determined that the second feature recognition information matching the second posture feature information exists based on the fourth detection information, stopping obtaining the orientation information of the target tracking assembly 60.

Specifically, step S61 is intended to obtain the orientation information of the target tracking assembly 60 at a specific moment to obtain the fourth detection information for subsequent processing. Step S62 is intended to obtain the pre-configured second posture feature information including the specific posture, shape or other features of the target, for subsequent comparison and recognition. Step S63 is intended to stop obtaining the orientation information of the target tracking assembly 60 when it is detected that the second feature recognition information of the target matches the pre-configured second posture feature information. When the specific feature of the target has been identified, there is no need further obtaining the orientation information.

The foregoing descriptions are merely exemplary embodiments of the present disclosure and are not intended to limit the present disclosure. Various modifications and variations of the invention may be made for those skilled in the art. Any modification, equivalent replacement, improvement etc. made within the spirit and principle of the present disclosure shall fall in the scope of the claims of the present disclosure.

What is claimed is:

1. A gimbal, comprising:

a handle assembly;

a first motor assembly, wherein the first motor assembly is mounted at one end of the handle assembly and is configured to drive a photographing device to rotate in an axial direction of the first motor assembly;

a second motor assembly, wherein the second motor assembly is mounted at one end of the first motor assembly and away from the handle assembly, the second motor assembly is configured to drive the photographing device to rotate in an axial direction of the second motor assembly;

a third motor assembly, wherein the third motor assembly is mounted at one end of the second motor assembly and away from the first motor assembly, the third motor assembly is configured to drive the photographing device to rotate in an axial direction of the third motor assembly;

a clamping assembly, wherein the clamping assembly is mounted on the third motor assembly and is configured to clamp the photographing device;

a control assembly, wherein the control assembly is mounted in the handle assembly and is connected to the first motor assembly, the second motor assembly and the third motor assembly; and a target tracking assembly, wherein the target tracking assembly is mounted on the third motor assembly and connected with the control assembly, the target tracking assembly is configured to obtain tracking information of a target object;

wherein the control assembly is configured to control the first motor assembly, the second motor assembly and the third motor assembly to rotate based on the tracking information obtained by the target tracking assembly, so that the photographing device clamped by the clamping assembly can keep tracking the target object to perform photographing.

2. The gimbal according to claim 1, wherein the target tracking assembly comprises a vision module and a housing provided with a through-hole, the housing is detachably mounted on the third motor assembly, the vision module is installed in the housing and is connected to the control assembly, the vision module is configured to obtain the tracking information of the target object through the through-hole.

3. The gimbal according to claim 2, wherein a camera orientation of the vision module is same with a camera orientation of the photographing device.

4. The gimbal according to claim 2, wherein the target tracking assembly further comprises a wireless positioning module, the wireless positioning module is installed in the housing and is connected to the control assembly; and when a communication device in the target object sends a communication signal, the wireless positioning module is configured to receive the communication signal and perform wireless communication with the target object to obtain tracking information.

5. The gimbal according to claim 4, wherein an antenna orientation of the wireless positioning module is same with a camera orientation of the photographing device.

6. The gimbal according to claim 4, wherein the target tracking assembly further comprises a fill-in light module, and the fill-in light module is installed in the housing and is configured to illuminate the target object.

7. The gimbal according to claim 6, wherein a light-emitting surface of the fill-in light module is oriented in a same direction as a camera orientation of the photographing device.

8. The gimbal according to claim 5, wherein the wireless positioning module is an ultra-wideband positioning module.

9. The gimbal according to claim 1, wherein the axial direction of the first motor assembly, the axial direction of the second motor assembly and the axial direction of the third motor assembly are different.

10. The gimbal according to claim 9, wherein a first connection portion is disposed on the target tracking assembly, a second connection portion cooperating with the first connection portion is disposed on the third motor assembly; and the target tracking assembly is fixedly mounted on the third motor assembly by cooperating of the first connection portion and the second connection portion, the target tracking assembly is electrically connected to the control assembly.

11. The gimbal according to claim 1, wherein a distance between the target tracking assembly and a camera of the photographing device is less than or equal to a preset threshold, the target tracking assembly is oriented in a same direction as a camera orientation of the photographing device, the target tracking assembly comprises a detection module, a positioning module and a position adjusting module, the detection module is configured to receive orientation information of the target tracking assembly and to obtain first detection information;

the positioning module is configured to: upon determining a first feature recognition information of the target object exists according to the first detection information, obtain a biometric feature recognition information of the target object; when the biometric feature recognition information matches a preset biometric feature recognition information, determine a position of a target part based on the position of the biometric feature recognition information in a field of view, determine position information of the target object based on the position of the target part; the first feature recognition information is feature information of the target object in a specific posture; the biometric feature recognition information is at least one of facial feature information, fingerprint feature information and iris feature information; and the position adjusting module is configured to send a tracking movement instruction to the control assembly based on the position information, so that the control assembly performs position adjustment control based on the position information and the camera of the photographing device oriented towards the target object.

12. A gimbal tracking method, applied to the gimbal according to claim 11, wherein the distance between the target tracking assembly of the gimbal and the camera of the photographing device is less than or equal to the preset distance threshold, the target tracking assembly is oriented in the same direction as the camera orientation of the photographing device, the method comprises:

receiving orientation information of the target tracking assembly, obtaining first detection information;

upon determining the first feature recognition information of the target object exists according to the first detection information, obtaining the biometric feature recognition information of the target object; when the biometric feature recognition information matches the preset biometric feature recognition information, determining a position of a target part based on the position of the biometric feature recognition information in the field of view and determining position information of the target object based on the position of the target part; the first feature recognition information is feature information of the target object in a specific posture; the biometric feature recognition information is at least one of facial feature information, fingerprint feature information and iris feature information; and sending a tracking movement instruction to the control assembly based on the position information, triggering the control assembly performs position adjustment control based on the position information, so that the camera of the photographing device oriented towards the target object.

13. The gimbal tracking method according to claim 12, wherein before receiving orientation information of the target tracking assembly and obtaining the first detection information, the method further comprises:

receiving orientation information of the target tracking assembly and obtaining second detection information; and upon determining contour recognition information of the target object exists according to the second detection information, determining that the target object exists.

14. The gimbal tracking method according to claim 13, wherein upon determining the contour recognition information of the target object exists according to the second detection information, determining that the target object exists comprising:

determining a contour information of each object according to the second detection information;

determining whether the contour information matching the contour recognition information of the target object exists in the contour information of each object; and upon determining the contour information matching the contour recognition information of the target object exists, determining that the target object exists.

15. The gimbal tracking method according to claim 12, wherein before obtaining the biometric feature recognition information of the target object upon determining the first feature recognition information of the target object exists according to the first detection information, the method further comprises:

performing feature analysis on the first detection information to obtain a detection feature; and determining whether the first feature recognition information of the target object exists based on the detection feature.

16. The gimbal tracking method according to claim 15, wherein before receiving orientation information of the target tracking assembly and obtaining the first detection information, the method further comprises:

receiving orientation information of the target tracking assembly and obtaining third detection information;

determining a waggle frequency of the gimbal based on the third detection information; sending a position correction instruction to the control assembly when the waggle frequency is greater than a preset frequency threshold, so that the control assembly performs position correction control;

and/or, determining a waggle angle of the gimbal based on the third detection information and sending a position correction instruction to the control assembly when the waggle angle is greater than a preset angle threshold, so that the control assembly performs position correction control.

17. The gimbal tracking method according to claim 13, wherein before receiving orientation information of the target tracking assembly and obtaining the second detection information, the method further comprises:

receiving orientation information of the target tracking assembly and obtaining third detection information;

determining a waggle frequency of the gimbal based on the third detection information; sending a position correction instruction to the control assembly when the waggle frequency is greater than a preset frequency threshold, so that the control assembly performs position correction control;

and/or, determining a waggle angle of the gimbal based on the third detection information and sending a position correction instruction to the control assembly when the waggle angle is greater than a preset angle threshold, so that the control assembly performs position correction control.

18. The gimbal tracking method according to claim 12, wherein after sending a tracking movement instruction to the control assembly based on the position information, triggering the control assembly performs position adjustment control based on the position information, so that the camera of the photographing device oriented towards the target object, the method further comprises:

receiving orientation information of the target tracking assembly and obtaining fourth detection information;

obtaining preconfigured second posture feature information; and upon determining second feature recognition information matching the second posture feature information exists based on the fourth detection information, stopping obtaining the orientation information of the target tracking assembly.

* * * * *